E. S. RUFFNER.
VALVE.
APPLICATION FILED JUNE 26, 1913.
1,097,730.
Patented May 26, 1914.
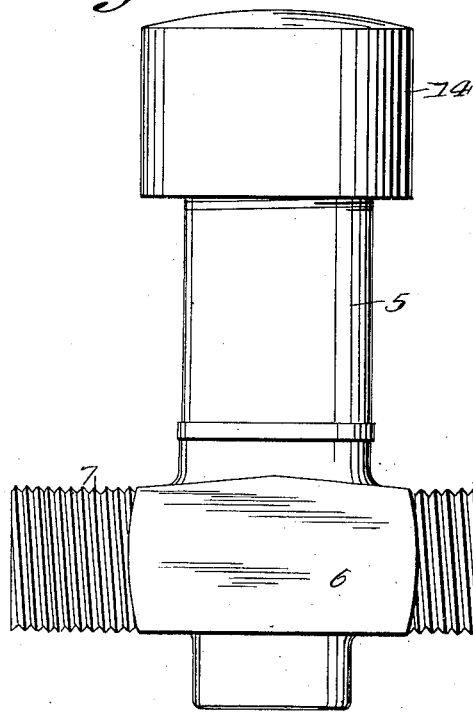
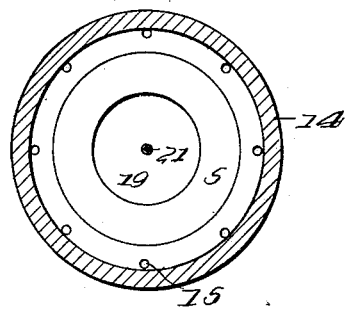
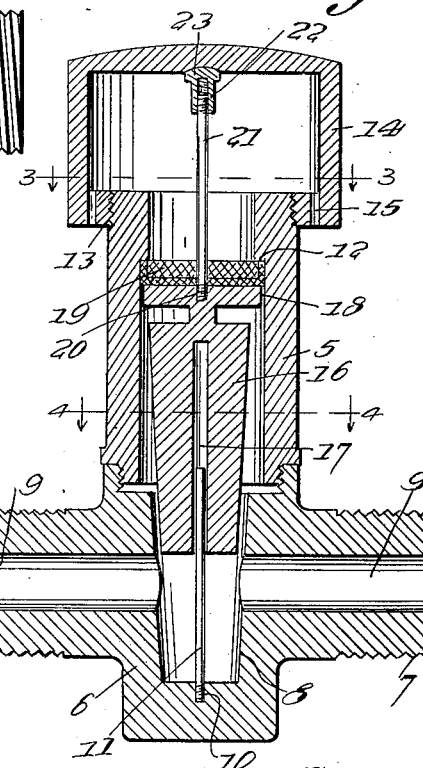
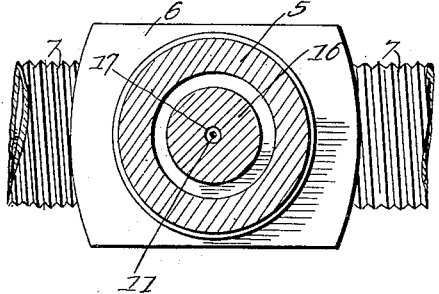
Witnesses
P. A. Putnam
L. E. Barkley
Inventor
Earl S. Ruffner,
by Franks Ackerman,
Attorney

UNITED STATES PATENT OFFICE.

EARL S. RUFFNER, OF WICHITA FALLS, TEXAS.

VALVE.

1,097,730. Specification of Letters Patent. Patented May 26, 1914.

Application filed June 26, 1913. Serial No. 775,939.

*To all whom it may concern:*

Be it known that I, EARL S. RUFFNER, a citizen of the United States of America, and resident of Wichita Falls, in the county of Wichita and State of Texas, have invented certain new and useful Improvements in Valves, of which the following is a specification.

This invention relates to check or safety valves and has for its object the provision of novel means for closing a conduit upon a reduction or cessation of pressure therein, thereby automatically shutting off the supply of the fluid which is being delivered through the conduit until the valve is manually reset.

It is to be understood that this invention may be applied to pipes or conduits for gas, water, oil or any other element which can be caused to flow through a conduit.

An object of the present invention is to provide a check valve which may be readily provide in a line pipe or conduit and which when set to establish communication through the pipe or conduit will remain so set during the time that the pressure is maintained in the said conduit or pipe, it being understood that the said device will automatically close the passage through the conduit or pipe by gravity when the pressure is removed from the gravitating member and said passage will remain closed until the gravitating member is elevated by manipulation and the pressure in the conduit or pipe is resumed or reëstablished.

With the foregoing and other objects in view, the invention consists in the details of construction and in the arrangement and combination of parts to be hereinafter more fully set forth and claimed.

In describing the invention in detail, reference will be had to the accompanying drawings, forming part of this specification wherein like characters denote corresponding parts in the several views, and in which—

Figure 1 illustrates a view in elevation of the check valve embodying the invention; Fig. 2 illustrates a vertical sectional view thereof; Fig. 3 illustrates a sectional view on the line 3—3 of Fig. 2; and Fig. 4 illustrates a sectional view on the line 4—4 of Fig. 2.

In these drawings 5 denotes the valve casing which is threaded to a coupling 6 having threaded nipples 7 by which the said coupling may be connected to the ends of a pipe or interposed in a pipe line, the said coupling having a valve seat 8 with which the passages 9 extending through the nipples communicate. At the bottom of the valve seat there is a threaded aperture 10 for the reception of the threaded end of the guide rod 11 which guide rod stands vertically in the coupling centrally of the valve seat. The valve casing 5 has an internal shoulder 12 forming a valve seat and the upper end of the said valve casing on its external surface is provided with threads 13 for the attachment of a cap 14 which cap has ports 15 leading to its interior for the purpose of relieving pressure within the valve chamber.

The device is provided with a valve 16 for closing the passages 9 in the nipples when the said valve descends to the seat 8 and the said valve 16 has an annular channel or recess 17 extending inwardly from its lower end which is designed to accommodate the guide rod 11 so that the valve 16 may be slidable on the said rod and be guided to the valve seat upon its descent. Associated with the valve 16 is a valve 18 having a packing 19, which packing may be in the nature of a yieldable washer or the like adapted to abut the valve seat and effect an air tight joint therebetween to prevent the escape of the fluid passing through the pipe. That part of the valve 16 which constitutes the valve 18 is provided with a threaded recess 20 to receive a threaded rod 21 whereby the said threaded rod is anchored to it and the upper end of the threaded rod 21 is likewise provided with threads 22 for the reception of a knob 23, which knob is adjustable on the said rod.

I claim

In a check valve, a hollow coupling having passages therethrough, the inner wall of the hollow coupling forming a valve seat through which the passages extend, a guide rod standing in the hollow coupling, a valve having a recess to receive the guide rod whereby the valve is guided, said valve being adapted to be held elevated by the pressure of fluid in the hollow portion of the coupling and adapted to fall by gravity to close the passages when pressure in the passages is reduced, a valve casing attached to the coupling and having a hollow portion communicating with the hollow portion of the coupling, said valve casing having a shoulder forming a valve seat, a valve on the outer end of the first mentioned valve adapted to seat on the valve seat of the casing when the valve is held elevated under pressure, a rod connected to the valve and a cap having an aperture on the free end of the casing.

In testimony whereof, I affix my signature in the presence of two witnesses.

EARL S. RUFFNER.

Witnesses:
 F. R. BOONE,
 H. BRIGHTWELL.

---

Copies of this patent may be obtained for five cents each, by addressing the "Commissioner of Patents, Washington, D. C."